(12) United States Patent
Marcuccio et al.

(10) Patent No.: US 9,803,430 B2
(45) Date of Patent: Oct. 31, 2017

(54) DOWNHOLE TOOL PROTECTION DURING WELLBORE CEMENTING

(71) Applicant: Halliburton Energy Services, Inc., Houston, TX (US)

(72) Inventors: Suzi Marie Marcuccio, Conroe, TX (US); Gireesh Bhat, Spring, TX (US); Louis Francis LaFleur, Spring, TX (US); Gregory Scott Cunningham, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 318 days.

(21) Appl. No.: 14/423,836

(22) PCT Filed: May 19, 2014

(86) PCT No.: PCT/US2014/038560
§ 371 (c)(1),
(2) Date: Feb. 25, 2015

(87) PCT Pub. No.: WO2015/156827
PCT Pub. Date: Oct. 15, 2015

(65) Prior Publication Data
US 2016/0251912 A1    Sep. 1, 2016

Related U.S. Application Data

(60) Provisional application No. 61/977,997, filed on Apr. 10, 2014.

(51) Int. Cl.
*E21B 34/06* (2006.01)
*E21B 17/08* (2006.01)
(Continued)

(52) U.S. Cl.
CPC .............. *E21B 17/08* (2013.01); *E21B 33/13* (2013.01); *E21B 33/14* (2013.01); *E21B 34/063* (2013.01);
(Continued)

(58) Field of Classification Search
CPC ..................................................... E21B 34/063
See application file for complete search history.

(56) References Cited

U.S. PATENT DOCUMENTS 5,355,956 A * 10/1994 Restarick ................ E21B 43/11
166/229
7,273,102 B2    9/2007 Sheffield
(Continued)

FOREIGN PATENT DOCUMENTS

WO    2008004876 A1    1/2008
WO    2015156827 A1    10/2015

OTHER PUBLICATIONS

International Search Report and Written Opinion for PCT/US2014/038560 dated Jan. 21, 2015.

*Primary Examiner* — George Gray
(74) *Attorney, Agent, or Firm* — McDermott Will & Emery LLP

(57) ABSTRACT

A casing mandrel includes a body having a first end and a second end, the first end being configured to be coupled to an upper portion of a casing string and the second end being configured to be coupled to a lower portion of the casing string, a downhole tool operatively coupled to an outer surface of the body, a tool port defined in the body and extending between the downhole tool and an interior of the body and thereby placing the downhole tool in fluid communication with the interior of the body, and at least one degradable plug disposed within the tool port to prevent wellbore debris from obstructing fluid communication (Continued)

between the interior and the downhole tool, wherein the degradable plug degrades over time.

27 Claims, 5 Drawing Sheets

(51) Int. Cl.
  *E21B 33/13* (2006.01)
  *E21B 33/14* (2006.01)
  *E21B 37/06* (2006.01)
  *E21B 47/06* (2012.01)
  *E21B 47/12* (2012.01)
  *C08G 63/06* (2006.01)

(52) U.S. Cl.
  CPC .............. *E21B 37/06* (2013.01); *E21B 47/06* (2013.01); *E21B 47/065* (2013.01); *E21B 47/12* (2013.01); *C08G 63/06* (2013.01)

(56) References Cited

U.S. PATENT DOCUMENTS

| | | | |
|---|---|---|---|
| 7,353,879 B2 | 4/2008 | Todd et al. | |
| 7,673,673 B2 | 3/2010 | Surjaatmadja et al. | |
| 7,963,331 B2 | 6/2011 | Surjaatmadja et al. | |
| 8,162,054 B2 | 4/2012 | Schultz et al. | |
| 2009/0101330 A1* | 4/2009 | Johnson | E21B 34/063 166/75.15 |
| 2011/0079390 A1 | 4/2011 | Themig | |
| 2013/0186626 A1 | 7/2013 | Aitken et al. | |
| 2014/0020898 A1* | 1/2014 | Holderman | E21B 43/12 166/304 |
| 2014/0083686 A1* | 3/2014 | Richards | E21B 47/01 166/250.01 |
| 2014/0318780 A1* | 10/2014 | Howard | E21B 23/06 166/285 |

\* cited by examiner

DOWNHOLE TOOL PROTECTION DURING WELLBORE CEMENTING

BACKGROUND

The present disclosure is related to downhole tools and, more particularly, to protecting downhole tools during wellbore cementing operations.

In the oil and gas industry, wellbores are drilled into the Earth's surface in order to access underground reservoirs for the extraction of hydrocarbons. Once a wellbore is drilled, it is often lined with casing or a string of casing lengths, and the casing is then secured into place using cement. In one cementing technique, a cement composition is pumped through the interior of the casing and allowed to flow back toward the surface via the annulus defined between the wellbore wall and the casing. The cement composition within the annulus is then allowed to cure, forming a hardened mass in the annulus. In another cementing technique, commonly referred to as reverse-circulation cementing, the cement composition is pumped through the annulus to the bottom of the wellbore and then back toward the surface via the interior of the casing. Once the cement composition cures within the annulus to form a hardened mass, the casing serves to stabilize the walls of the surrounding subterranean formation to prevent any potential caving into the wellbore. The casing also isolates the various surrounding subterranean formations by preventing the flow or cross-flow of formation fluids via the annulus. The casing further provides a surface to secure pressure control equipment and downhole production equipment, such as a drilling blowout preventer (BOP) or a production packer.

In some downhole applications, one or more downhole tools may be run downhole with the casing and permanently installed therewith, meaning that the downhole tools are meant to remain within the casing throughout the life of the well. Such downhole tools are typically arranged on the exterior of a casing mandrel coupled to the casing string at a predetermined location in the wellbore. An example of such a downhole tool is a chemical injector, which may remain in fluid communication with a surface location by being ported to the interior of the casing at a tool port. Various treatment fluids and/or chemicals may be conveyed from the surface to the chemical injector to be injected into the casing at the tool port for various purposes. Another exemplary downhole tool is a gauge mandrel that includes various gauges and/or sensors that are ported to the interior of the casing at a tool port. Such gauges/sensors may monitor the fluids circulating in the casing and report real-time fluid parameters (i.e., temperature, pressure, etc.) to a surface location (e.g., via wired or wireless communication).

While cementing the casing within the wellbore, however, the cement composition and/or other wellbore debris may obstruct and otherwise occlude the tool port that provides fluid communication between the downhole tool and the interior of the casing. If the tool port is obstructed, then operation of the downhole tool will likely be frustrated.

To prevent the influx of the cement composition or other wellbore debris into the tool port, a burst disk may be utilized, which is typically arranged within the tool port. Following placement of the cement composition, the casing may be pressurized to rupture the burst disk and thereby initiate fluid communication between the permanent downhole tool and the interior of the casing. The burst disk, however, is susceptible to failure during the cementing operation and can otherwise develop premature leaks. As a result, the burst disk is often unable to rupture in response to the increased fluid pressure within the casing, thereby rendering the downhole tool inoperable for its intended purpose.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to downhole tools and, more particularly, to protecting downhole tools during wellbore cementing operations.

The embodiments disclosed herein provide a degradable plug used to plug a tool port leading from an interior of a casing mandrel to a downhole tool associated with the casing mandrel. The degradable plug, among other things, prevents wellbore debris from entering and plugging an inlet to the tool port, which would otherwise render the downhole tool unsuitable for its intended purposes. The degradable plug may degrade or dissolve after a period of time or following exposure to a particular wellbore environment, after which fluid communication between the interior of the casing mandrel and the downhole tool may be established. The downhole tool may then be able to fluidly communicate with the interior of the casing mandrel via the tool port.

The present disclosure may be particularly useful in running a cementing operation to secure a casing string within a wellbore. The casing string may have a casing mandrel arranged between upper and lower portions of the casing string, and a downhole tool may be arranged on the casing mandrel. The degradable plug(s) may be arranged within a tool port leading to the downhole tool, and thereby prevent the cement composition and other wellbore debris from entering the tool port. Once the cementing operation is completed, the degradable plug may degrade or dissolve to allow the downhole tool to access the fluids circulating through the casing string.

Figure 1:
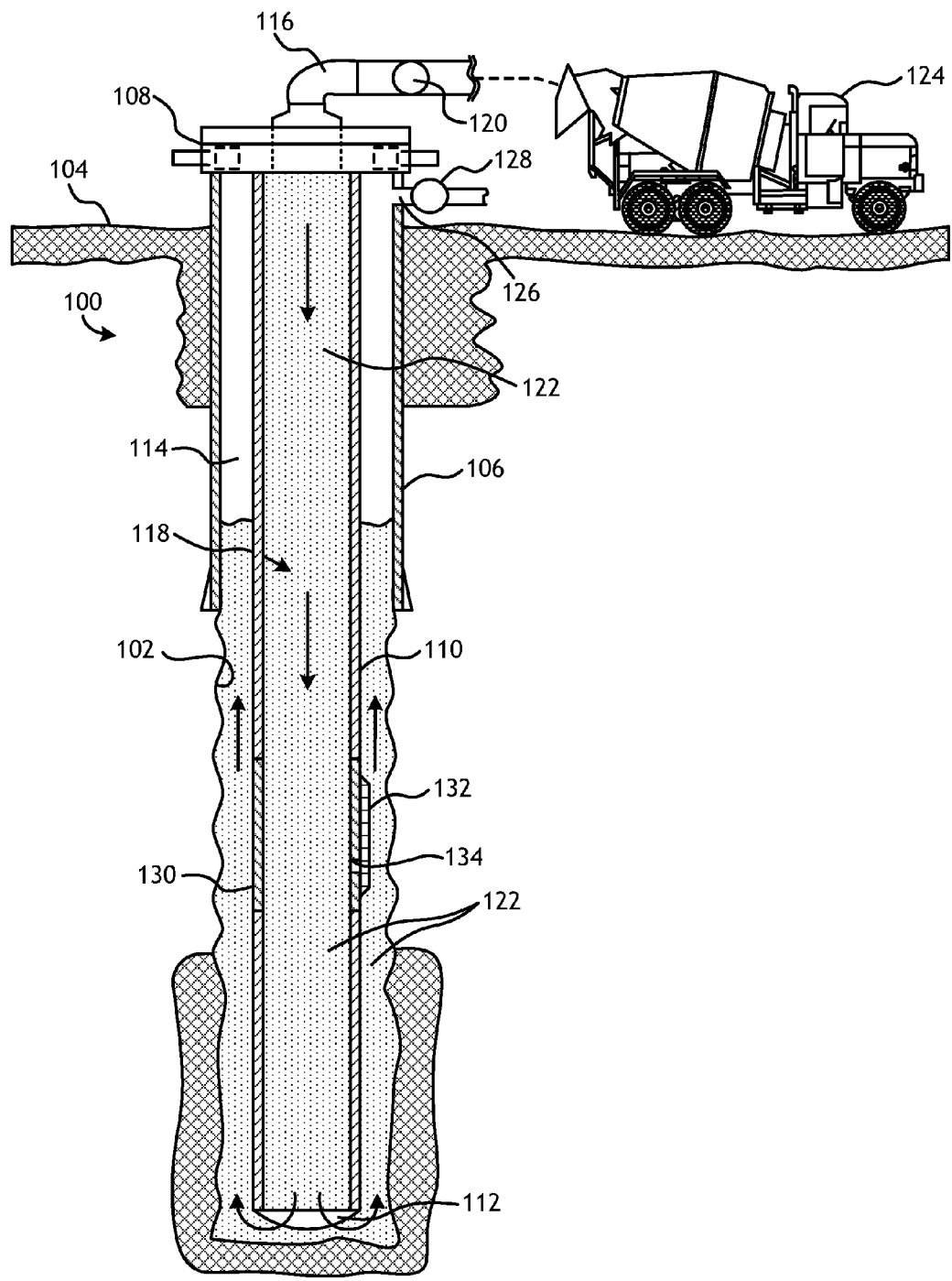
FIG. 1 illustrates a cross-sectional side view of a wellbore system that may employ one or more principles of the present disclosure.

Referring to FIG. 1, illustrated is a cross-sectional side view of a wellbore system 100 that may employ one or more of the principles of the present disclosure. More particularly, FIG. 1 depicts a wellbore 102 that has been drilled into the Earth's surface 104 and a surface casing 106 secured within the wellbore 102 and extending from the surface 104. A wellhead installation 108 is depicted as being arranged at the surface 104 and a casing string 110 is suspended within the wellbore 102 from the wellhead installation 108. A casing shoe 112 may be attached at the bottom-most portion of the casing string 110, and an annulus 114 is defined between the wellbore 102 and the casing string 110.

As used herein, the term "casing string," as in the casing string 110, may refer to a tubular casing length extending through a wellbore that may comprise a plurality of tubular casing lengths coupled (e.g., threaded) together to form a continuous tubular conduit of a desired length. It will be appreciated, however, that the casing string 110 may equally refer to a single tubular length or structure, without departing from the scope of the disclosure.

At the surface 104, a feed line 116 may be operably and fluidly coupled to the wellhead installation 108 and in fluid communication with an interior 118 of the casing string 110. The feed line 116 may have a feed valve 120 configured to regulate the flow of cement 122 into the interior 118 of the casing string 110, and the feed line 116 may be fluidly coupled to a source 124 of cement 122. In the depicted embodiment, the source 124 of the cement 122 is a cement truck, but could equally be a cement head, a standalone pump, or any other pumping mechanism known to persons skilled in the art and capable of introducing the cement 122 into the interior 118 of the casing string 110. A return line 126 may also be connected to the wellhead installation 108 and in fluid communication with the annulus 114. In some cases, as illustrated, the return line 126 may include a return valve 128 configured to regulate the flow of fluids returning to the surface 104 via the annulus 114.

In order to secure the casing string 110 within the wellbore 102, cement 122 may be pumped from the source 124 and into the interior 118 of the casing string 110 via the feed line 116. The cement 122 flows to the bottom of the casing string 110 and is diverted at the casing shoe 112 back toward the surface 104 within the annulus 114.

In some embodiments, a casing mandrel 130 may be arranged on and otherwise incorporated into the casing string 110 at a predetermined location within the wellbore 102. More particularly, the casing mandrel 130 may be coupled at either end to opposing portions of the casing string 110, and thereby form an integral part or length of the casing string 110. In some embodiments, the casing mandrel 130 may be threaded into the casing string 110. In other embodiments, the casing mandrel 130 may be mechanically fastened (e.g., screwed, bolted, pinned, etc.) or welded into the casing string 110, without departing from the scope of the disclosure.

The casing mandrel 130 may include one or more downhole tools 132 coupled or otherwise attached to its outer surface, and the downhole tool 132 may be ported to the interior 118 of the casing string 110 via a tool port 134. In some embodiments, the downhole tool 132 may be a chemical injector configured to inject treatment fluids and/or chemicals into the interior 118 of the casing string 110 via the tool port 134. In other embodiments, however, the downhole tool 132 may be a gauge or sensor configured to monitor the real-time parameters of fluids within the casing string 110 via the tool port 134. For example, the gauge or sensor may be in fluid communication with the fluid within the casing string 110 via the tool port 134, and the gauge/sensor may be configured to monitor and report the temperature, pressure, flow rate, density, pH, viscosity, etc. of the fluid.

For purposes of this disclosure, the casing mandrel 130 will be depicted and described herein as a "gauge mandrel" and the downhole tool 132 will depicted and described herein as a "gauge." Those skilled in the art, however, will readily appreciate that the principles of this disclosure may equally apply to a chemical injector mandrel and a chemical injector, respectively, or any other mandrel and associated downhole tool configured to be permanently installed in the casing string 110 as described herein.

According to the present disclosure, the tool port 134 may be occluded and otherwise plugged with a degradable material so that the cement 122, cement particulates, and/or other wellbore debris may be substantially prevented from obstructing the tool port 134 during the cementing operation. After a predetermined amount of time, or following exposure to a particular wellbore environment (e.g., temperature, pressure, fluid, etc.), the degradable material may be configured to dissolve and thereby establish fluid communication between the downhole tool 132 and the interior 118 of the casing string 110 via a tool port 134.

Figure 2A:
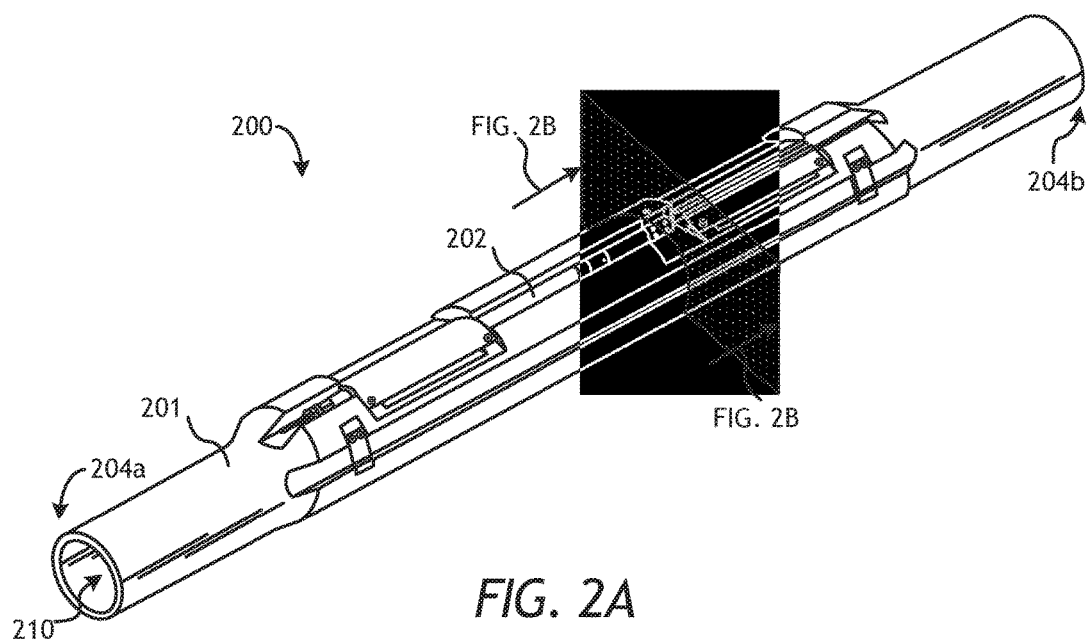
FIGS. 2A-2C illustrate various views of an exemplary casing mandrel, according to one or more embodiments of the present disclosure.
Figure 2B:
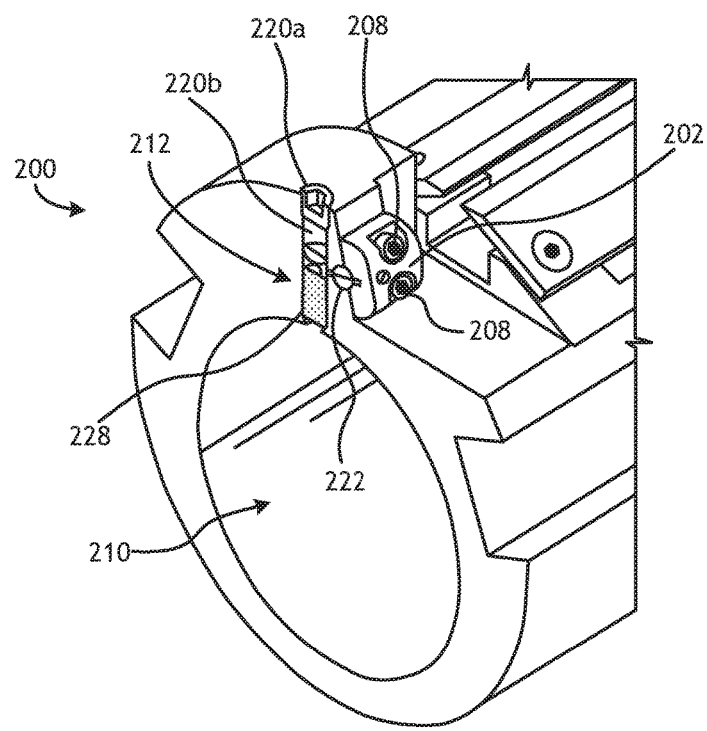
Figure 2C:
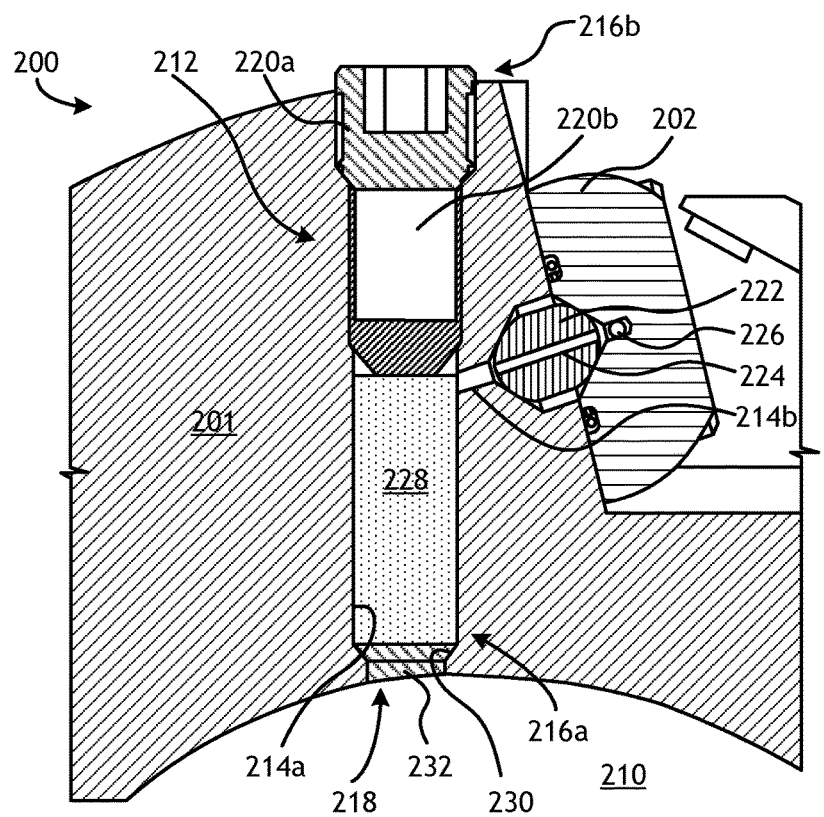

Referring now to FIGS. 2A-2C, with continued reference to FIG. 1, illustrated are various views of an exemplary casing mandrel 200, according to one or more embodiments of the present disclosure. More particularly, FIG. 2A depicts an isometric view of the casing mandrel 200, FIG. 2B depicts a cross-sectional isometric view of the casing mandrel 200 taken at an intermediate location, and FIG. 2C depicts an enlarged end view of the cross-sectional view of the casing mandrel 200 of FIG. 2B. The casing mandrel 200 may be similar in some respects to the casing mandrel 130 of FIG. 1 and may therefore be best understood with reference thereto.

The casing mandrel 200 may include a generally cylindrical body 201 having a first end 204*a* and a second end 204*b*. At each end 204*a,b* the body 201 may be configured to be coupled to the casing string 110 (FIG. 1) and thereby form an integral part or length thereof. In other words, the first end 204*a* may be configured to be coupled to an upper portion of the casing string 110 (i.e., extending uphole) and the second end 204*b* may be configured to be coupled to a lower portion of the casing string 110 (i.e., extending downhole). In some embodiments, the body 201 may be threaded at each end 204*a,b* to the casing string 110, or may alternatively (or in addition thereto) be mechanically fastened (e.g., screwed, bolted, pinned, etc.) or welded to the casing string 110 at each end 204*a,b*, without departing from the scope of the disclosure. In some embodiments, the casing mandrel 200 may be a permanent downhole gauge, such as a ROC™ permanent downhole gauge commercially available through Halliburton Energy Services of Houston, Tex., USA. In other embodiments, however, the casing mandrel 200 may be any other type of casing mandrel configured to be permanently installed in the casing string 110.

As depicted, the casing mandrel 200 includes a downhole tool 202 that may be operatively coupled to an outer surface of the body 201. The downhole tool 202 may be secured to the body 201 in a variety of ways and, in at least one embodiment, may extend generally longitudinally along the exterior of the body 201. In one or more embodiments, as best seen in FIG. 2B, the downhole tool 202 may be secured to the body 201 using one or more mechanical fasteners 208. In other embodiments, however, the downhole tool 202 may be threaded, welded, and/or brazed to the body 201, without departing from the scope of the disclosure.

The downhole tool 202 may be used to measure or otherwise monitor fluids flowing within or circulating through the body 201 and, therefore, within and/or through the casing string 110 (FIG. 1) as coupled thereto. To accomplish this, the downhole tool 202 may be in fluid communication with an interior 210 of the body 201 via a tool port 212 defined in the body 201. The tool port 212 may be similar to the tool port 134 of FIG. 1 and may encompass or otherwise include one or more conduits that extend between the downhole tool 202 and the interior 210 of the body 201.

Referring specifically to FIG. 2C, the tool port 212 may include a first conduit 214a and a second conduit 214b that fluidly and structurally intersects the first conduit 214a. The first conduit 214a may be defined in the body 201 and provide an inner end 216a and an outer end 216b. At the inner end 216a, the first conduit 214a may define an inlet 218 that allows fluids from the interior 210 of the body 201 to enter into the tool port 212. The outer end 216b of the first conduit 214a may communicate with the exterior of the body 201. Accordingly, in at least one embodiment, the first conduit 214a may be defined through the body 201, from the exterior to the interior 210 thereof.

In the illustrated embodiment, one or more port plugs 220 (shown as first and second port plugs 220a and 220b) may be disposed within the first conduit 214a at or near the outer end 216b. The first port plug 220a may be a threaded plug configured to be threaded into the first conduit 214a. The second port plug 220b may be an expansion plug, such as a commercially available LEE PLUG®. The first and second port plugs 220a,b may be useful in preventing wellbore debris from entering the first conduit 214a via the exterior of the body 201. In at least one embodiment, however, one of the first or second port plugs 220a,b may be omitted, without departing from the scope of the disclosure.

The second conduit 214b may fluidly and structurally intersect the first conduit 214a at an intermediate location between the inner and outer ends 216a,b and may be in direct fluid communication with the downhole tool 202. Accordingly, the second conduit 214b may be characterized or otherwise referred to herein as a "gauge port," or the conduit that leads directly into the downhole tool 202. In some embodiments, a metal-to-metal seal 222 may be arranged in the second conduit 214b and have a weep hole 224 defined therethrough. The metal-to-metal seal 222 may be secured within the second conduit 214b as the downhole tool 202 is secured to the body 201 using the mechanical fasteners 208 (FIG. 2B). The curved or arcuate ends of the metal-to-metal seal 222 may help facilitate or otherwise provide a sealed interface between the downhole tool 202 and the second conduit 214b. The weep hole 224 defined through the metal-to-metal seal 222 may allow a proportioned amount of fluid that enters the tool port 212 from the interior 210 of the body 201 to communicate with the downhole tool 202. Any fluids that bypass the weep hole 224 may be allowed to enter a gauge conduit 226 that intersects with and extends substantially axially from the second conduit 214b.

According to the present disclosure, a degradable plug 228 may be disposed or otherwise secured within the tool port 212 and used to prevent wellbore debris from obstructing fluid communication between the interior 210 of the body 201 and the downhole tool 202. Exemplary wellbore debris that the degradable plug 228 may be designed to restrict or prevent from entering the tool port 212 may include, but is not limited to, cement (e.g., the cement 122 of FIG. 1), cement particulates, sand, metal shavings, combinations thereof, and the like. In some embodiments, the degradable plug 228 may be threaded into the tool port 212. In other embodiments, the degradable plug 228 may be press fit into the tool port 212. In yet other embodiments, the degradable plug 228 may be secured within the tool port 212 using a combination of both threading and press fitting. In even further embodiments, the degradable plug 228 may be inserted into the tool port 212 and secured therein with at least one of the port plugs 220a,b in addition to, or in place of threading and/or press fitting. In other embodiments, the degradable plug 228 may be secured within the tool port 212 using any other attachment technique including, but not limited to, welding, brazing, adhesives, mechanical fasteners, combinations thereof, and the like.

In the illustrated embodiment, the degradable plug 228 is disposed within the first conduit 214a and at least partially secured therein with the first and second plugs 220a,b. More particularly, threading the first port plug 220a into the first conduit 214a may have the effect of urging the second port plug 220b into axial engagement with one end of the degradable plug 228 while the opposing end of the degradable plug 228 is forced into engagement with a beveled surface 230 of the inlet 218. The degradable plug 228 may be made of a degradable material configured to initially plug or occlude the tool port 212 and subsequently dissolve or degrade away, and thereby allow fluid communication between the interior 210 of the body 201 and the downhole tool 202 after a predetermined period of time. As used herein, the term "degradable" refers to any material or substance that is capable of or otherwise configured to degrade or dissolve after a predetermined period of time or following exposure or interaction with a particular downhole environment (e.g., temperature, pressure, a downhole or wellbore fluid), a treatment fluid, etc.

Suitable degradable materials that may be used in accordance with the embodiments of the present disclosure for the degradable plug 228 include polyglycolic acid (PGA), polylactic acid (PLA), and polylactic co-glycolic acid (PLGA), which tend to degrade by hydrolysis as the ambient temperature increases, and which could be pure or laced with fiber materials to change its strength, degradation, acidification or other properties. Other suitable degradable materials include oil-degradable polymers (and any co-polymers thereof), which may be either natural or synthetic polymers and include, but are not limited to, polyacrylics, polyamides, and polyolefins such as polyethylene, polypropylene, polyisobutylene, and polystyrene. Other suitable oil-degradable polymers include those that have a melting point that is such that it will dissolve at the temperature of the subterranean formation in which it is placed, such as a wax material or a degradable rubber.

In addition to oil-degradable polymers, other degradable materials that may be used in conjunction with the embodiments of the present disclosure include, but are not limited to, degradable polymers, dehydrated salts, and/or mixtures of the two. As for degradable polymers, a polymer is considered to be "degradable" if the degradation is due to, in situ, a chemical and/or radical process such as hydrolysis, oxidation, or UV radiation. The degradability of a polymer depends at least in part on its backbone structure. For instance, the presence of hydrolyzable and/or oxidizable linkages in the backbone often yields a material that will degrade, as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like.

Suitable examples of degradable polymers that may be used in accordance with the embodiments of the present invention include, but are not limited to, polysaccharides such as dextran or cellulose; chitins; chitosans; proteins; aliphatic polyesters; poly(lactides); poly(glycolides); poly (ε-caprolactones); poly(hydroxybutyrates); poly(anhydrides); aliphatic or aromatic polycarbonates; poly(orthoesters); poly(amino acids); poly(ethylene oxides); and polyphosphazenes. Combinations, including copolymers, of these may be suitable as well. Of these suitable polymers, as mentioned above, polyglycolic acid and polylactic acid may be preferred.

Polyanhydrides are another type of suitable degradable polymer useful in the embodiments of the present invention. Polyanhydride hydrolysis proceeds, in situ, via free carboxylic acid chain-ends to yield carboxylic acids as final degradation products. The erosion time can be varied over a broad range of changes in the polymer backbone. Examples of suitable polyanhydrides include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride).

Dehydrated salts may be used in accordance with the embodiments of the present disclosure as a degradable material. A dehydrated salt is suitable for use in the disclosed embodiments if it will degrade over time as it hydrates. For example, a particulate solid anhydrous borate material that degrades over time may be suitable. Specific examples of particulate solid anhydrous borate materials that may be used include, but are not limited to, anhydrous sodium tetraborate (also known as anhydrous borax), and anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are highly soluble in water as compared to anhydrous borate materials and as a result degrade in the aqueous fluid. In some instances, the total time required for the anhydrous borate materials to degrade in an aqueous fluid is in the range of from about 8 hours to about 72 hours depending upon the temperature of the subterranean zone in which they are placed. In other applications, the anhydrous borate materials may be configured to degrade in an aqueous fluid in more than 72 hours, such as in the span of a week, two weeks, or longer. Other examples include organic or inorganic salts like acetate trihydrate.

Blends of certain degradable materials may also be suitable. One example of a suitable blend of materials is a mixture of polylactic acid and sodium borate where the mixing of an acid and base could result in a neutral solution where this is desirable. Another example would include a blend of poly(lactic acid) and boric oxide. The choice of degradable material also can depend, at least in part, on the conditions of the well, e.g., wellbore temperature. For instance, lactides have been found to be suitable for lower temperature wells, including those within the range of 150° F. to 350° F., and polylactides have been found to be suitable for well bore temperatures above this range. Also, poly(lactic acid) may be suitable for higher temperature wells. Some stereoisomers of poly(lactide) or mixtures of such stereoisomers may be suitable for even higher temperature applications. Dehydrated salts may also be suitable for higher temperature wells.

In some embodiments, the degradable material may be configured to decompose in the presence of an aqueous fluid in a wellbore environment. A fluid is considered to be "aqueous" herein if the fluid comprises water alone or if the fluid contains water. Accordingly, while the degradable material may be formed of any material that is suitable for service in a downhole environment and that provides adequate strength to enable proper operation of the degradable plug 228, one should choose the particular material according to the particular pressures and/or temperature ranges to which the degradable plug 228 will be subjected, and should consider the degradation rate and its associated implications on the overall purpose for the use of degradable plug 228. At a given pressure and temperature range, for example, a degradable plug 228 may need to maintain its integrity to, in effect, act as a 30-minute plug, a three-hour plug, a 12-hour plug, a one-day plug, a three-day plug, for example, or any other timeframe desired by the well operator. The choice of degradable material will enhance the outcome and performance of the degradable plug 228. For instance, polylactic acid may be more suitable for longer term uses than anhydrous borate materials at most conventional temperature operations.

In other embodiments, degradable plug 228 may comprise a degradable material that includes a galvanically corrodible metal or material configured to degrade via an electrochemical process in which the galvanically corrodible metal corrodes in the presence of an electrolyte (e.g., brine or other salt fluids in a wellbore). Suitable galvanically corrodible metals include, but are not limited to, gold, gold-platinum alloys, silver, nickel, nickel-copper alloys, nickel-chromium alloys, copper, copper alloys (e.g., brass, bronze, etc.), chromium, tin, aluminum, iron, zinc, magnesium, and beryllium. Combinations of these may be suitable as well.

Accordingly, in some embodiments, the degradable plug 228 may prove advantageous in protecting the downhole tool 202 from wellbore debris, such as cement or cement particulates, during a cementing operation to secure the casing string 110 (FIG. 1) within the wellbore 102. Following the cementing operation, however, the degradable plug 228 may gradually degrade or dissolve away from within the first conduit 214a after a predetermined period of time or otherwise after becoming exposed to the wellbore environment (e.g., temperature, pressure, fluids, etc.). Once the degradable plug 228 dissolves away, fluids within the interior 210 of the body 201 may be able to enter the tool port 212 via the inlet 218 and access the downhole tool 202 via the first and second conduits 214a,b.

In some embodiments, it may be desirable to retard the initial degradation rate of the degradable plug 228 while downhole. For instance, a degradable plug 228 comprising PGA may exhibit a material degradation rate that increases as temperature increases. In some applications, it may prove advantageous to slow the initial onset of degradation of the PGA. This may be accomplished by arranging or otherwise disposing a delay plug 232 within the tool port 212 and, more particularly, at the inlet 218 to the tool port 212. The delay plug 232 may be a solid, cylindrical structure, as illustrated, or may equally be a coating applied to the end of the degradable plug 228.

The delay plug 232 may provide a mechanical boundary that prevents premature degradation of the degradable plug 228. In some embodiments, the delay plug 232 may be configured to degrade at a rate that is slower than the degradable plug 228. The configuration of the delay plug 232 may involve a different choice of degradable material from those disclosed herein (e.g., a material that is more stable than PGA at the encountered temperature and pressures), or it may involve a choice of a different type of material all together. For example, a different type of material for the delay plug 232 may include, but is not limited to, wax, grease, oil, dissolvable rubber, and any combination thereof. Accordingly, the delay plug 232 may be configured to degrade at a slow rate, as compared to the degradable plug 228, but will eventually degrade and/or dissolve. With the delay plug 232 dissolved, the degradable plug 228 may then be exposed to the wellbore environment via the inlet 218 and any wellbore or treatment fluids present therein, which may initiate degradation of the degradable plug 228.

In other embodiments, the delay plug 232 may be non-degradable and otherwise made of a material that does not degrade or dissolve in a wellbore environment. Exemplary non-degradable materials that may be used in such embodiments include, but are not limited to, paint, TEFLON®, rubber, ceramics, metals, combinations thereof, and the like. In embodiments where the delay plug 232 is non-degradable, the delay plug 232 may define or otherwise provide a small weep hole (not shown) that provides fluid communication between the interior 210 of the body 201 and the degradable plug 228. In such embodiments, the degradable plug 228 may be exposed to the wellbore environment via the weep hole in the delay plug 232 and, therefore, may begin degrading immediately. However, since the weep hole only allows a small amount of the wellbore and/or treatment fluids present within the interior 210 of the body 201 to contact the degradable plug 228, it will require a longer period of time before the entire cross-sectional area of the degradable plug 228 dissolves.

In some embodiments, a delay plug 232 comprising paint may be configured to break into several small pieces and eventually be washed out of the casing mandrel 200. In some embodiments, a delay plug 232 made of TEFLON®, rubber, ceramics, and metals, however, may be configured or otherwise designed to dislodge from the first conduit 214a once the degradable plug 228 degrades sufficiently, and thereby allow communication to the interior 210 of the body 201.

As will be appreciated, the addition of the delay plug may prove advantageous in reducing the required length of the degradable plug 228, which can decrease the overall required length of the casing mandrel 200. Reducing the length of the casing mandrel 200 may, in turn, reduce costs and reduce or entirely prevent the chance of wellbore debris or cement from obstructing the tool port 212.

In yet other embodiments, the degradation of the degradable plug 228 may be slowed by incorporating two dissimilar degradable materials in the degradable plug 228, dissimilar referring to the degradation properties of the degradable materials. For example, a first portion of the degradable plug 228 may comprise a first material and occupy a portion of the tool port 212 closest to the inlet 218. A second portion of the degradable plug 228 may be comprise a second material and occupy a portion of the tool port 212 further away from the inlet 218 but contiguous with the first portion. The first material may be chosen to degrade at a rate much slower relative to the first material (or vice versa). As a result, the first portion of the degradable plug 228 may be able to occupy a much smaller volume within the tool port 212 than the second portion since it will degrade slower than the second material of the second portion.

Figure 3A:
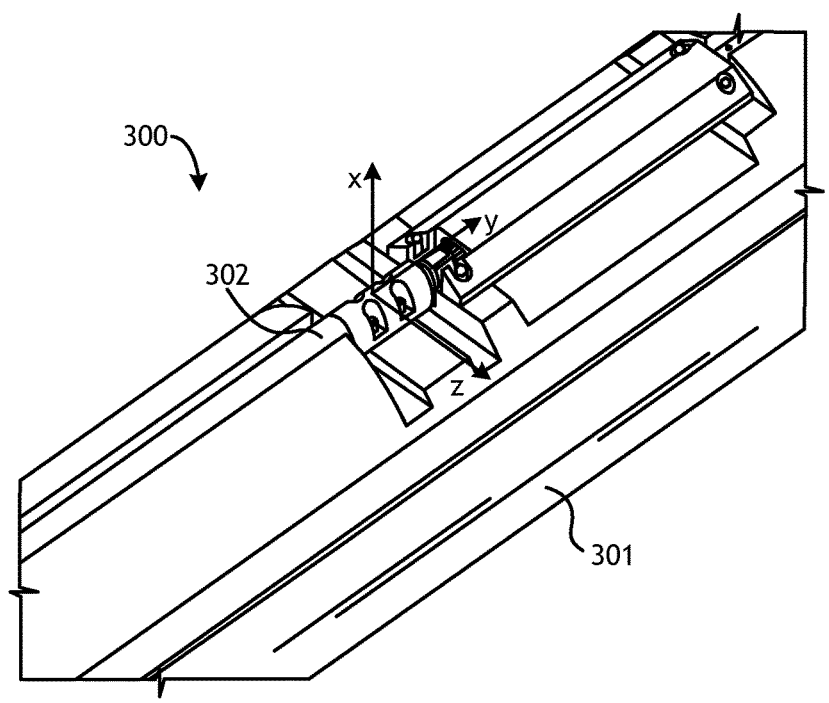
FIGS. 3A-3C illustrate various views of another exemplary casing mandrel, according to one or more embodiments of the present disclosure.
Figure 3B:
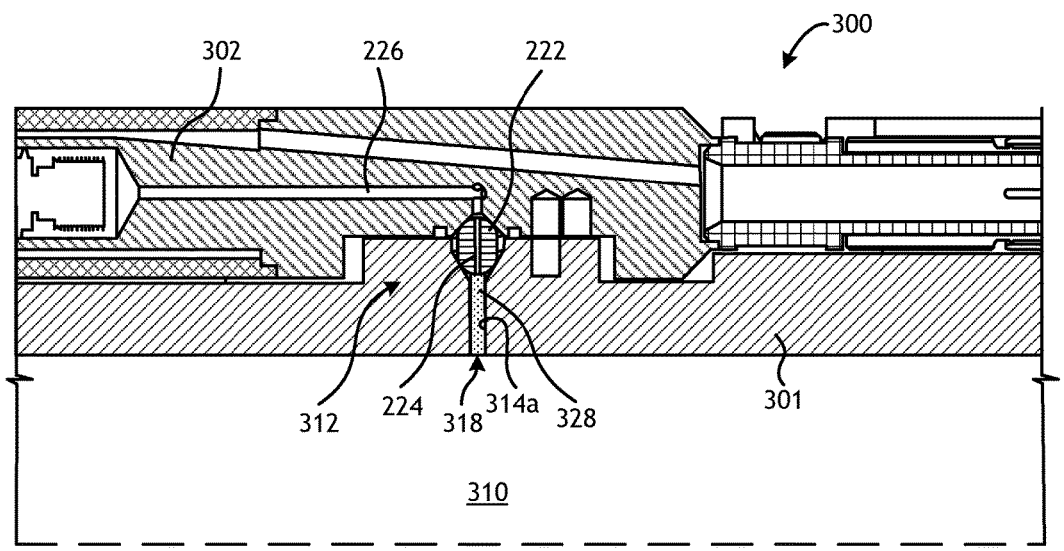
Figure 3C:
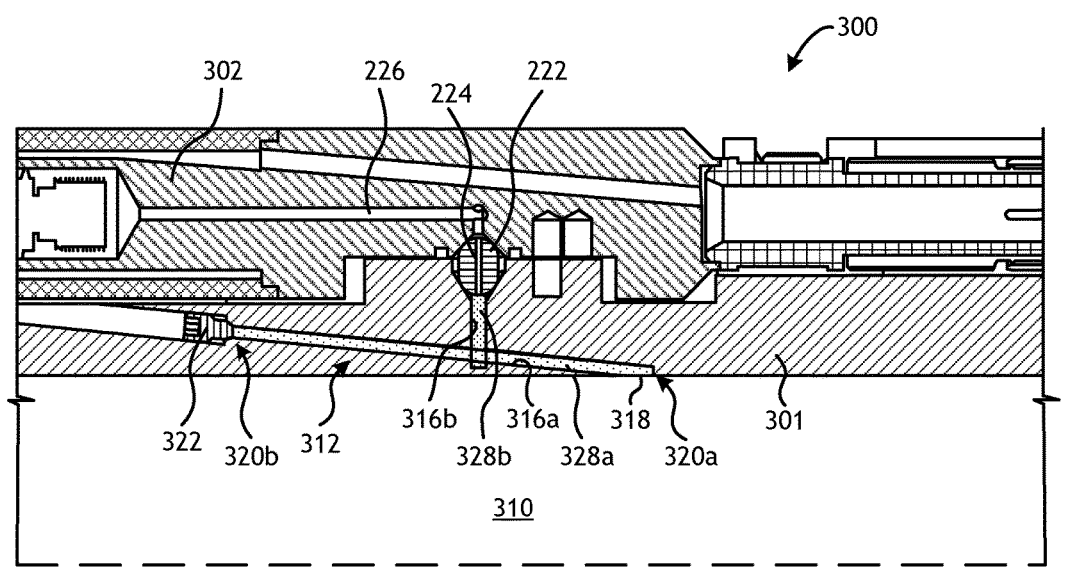

Referring now to FIGS. 3A-3C, with continued reference to FIGS. 1 and 2A-2C, illustrated are various views of another exemplary embodiment of a casing mandrel 300, according to one or more embodiments of the present disclosure. More particularly, FIG. 3A depicts an isometric view of the casing mandrel 300, FIG. 3B depicts a cross-sectional side view of one exemplary embodiment of the casing mandrel 300 taken along the Y-axis, and FIG. 3C depicts a cross-sectional side view of another exemplary embodiment of the casing mandrel 300 taken along the Y-axis.

The casing mandrel 300 may be similar in some respects to the casing mandrel 200 of FIGS. 2A-2C and, therefore, may be best understood with reference thereto. For instance, similar to the casing mandrel 200 (FIGS. 2A-2C), the casing mandrel 300 may include a generally cylindrical body 301 configured to be coupled to the casing string 110 (FIG. 1) and thereby form an integral part or length thereof. Moreover, the casing mandrel 300 includes a downhole tool 302 that may be operatively coupled to an outer surface of the body 301. The downhole tool 302 may extend generally longitudinally along the exterior of the body 301 and may be secured to the body 301 via one or more of threading, welding, and/or brazing the downhole tool 302 to the body 301.

Similar to the downhole tool 202 of FIGS. 2A-2C, the downhole tool 302 may be used to measure or otherwise monitor fluids flowing within or circulating through the casing mandrel 300 (i.e., the body 301) and, therefore, within and/or through the casing string 110 (FIG. 1). To accomplish this, the downhole tool 302 may be in fluid communication with an interior 310 of the body 301 via a tool port 312 (FIGS. 3B and 3C) defined in the body 301. The tool port 312 may be similar to the tool port 212 of FIGS. 2B and 2C and may encompass or otherwise include one or more conduits that extend between the downhole tool 302 and the interior 310 of the body 301.

Referring specifically to FIG. 3B, the tool port 312 may include a first conduit 314a defined in the body 301 and extending radially between the downhole tool 302 and an inlet 318 to the tool port 312. Accordingly, in the illustrated embodiment, the first conduit 314a may be characterized or otherwise referred to as the "gauge port." The metal-to-metal seal 222 may be arranged in the first conduit 314a and secured therein by fastening the downhole tool 302 to the body 301 (e.g., using one or more mechanical fasteners). Any fluids that bypass the metal-to-metal seal 222 via the weep hole 224 may enter the gauge conduit 226 that leads away from the metal-to-metal seal 222 and to the internal components of the downhole tool 302.

As illustrated, a degradable plug 328 may be disposed or otherwise secured within the tool port 312 and used to prevent wellbore debris from obstructing fluid communication between the interior 310 of the body 301 and the downhole tool 302. More particularly, the degradable plug 328 may be disposed within the first conduit 314a. In some embodiments, the degradable plug 328 may be threaded and/or press fit into the first conduit 314a. In other embodiments, and depending on the material, the degradable plug 328 may be welded or brazed into the first conduit 314a.

The degradable plug 328 may be similar to the degradable plug 228 of FIGS. 2B-2C (e.g., comprising similar materials disclosed herein above) and, therefore, configured to initially plug or occlude the tool port 312 and subsequently dissolve or degrade away, and thereby establish fluid communication between the interior 310 of the body 301 and the downhole tool 302. Accordingly, once the degradable plug 328 degrades or dissolves away from within the first conduit 314a, fluids within the interior 310 of the body 301 may be able to enter the tool port 312 via the inlet 318 and access the downhole tool 302 via the first conduit 314a.

Referring to FIG. 3C, the tool port 312 in the depicted embodiment may include a first conduit 316a and a second conduit 316b that intersects the first conduit 316a. The first conduit 316a may be defined in the body 301 and provide an inner end 320a and an outer end 320b. At the inner end 320a, the first conduit 316a may define or otherwise provide the inlet 318 into the tool port 312 from the interior 310 of the body 301. The outer end 320*b* of the first conduit 316*a* may communicate with the exterior of the body 301 (i.e., when the downhole tool 302 is not coupled thereto). Accordingly, the first conduit 316*a* may be defined through the body 301, from the exterior to the interior 310 thereof.

In the illustrated embodiment, one or more port plugs 322 may be disposed within the first conduit 316*a* at or near the outer end 320*b*. The port plug 322 may be at least one of a threaded plug and an expansion plug (or a combination thereof) and may be useful in preventing wellbore debris from entering the first conduit 316*a* via the exterior of the body 301. The second conduit 316*b* may fluidly and structurally intersect the first conduit 316*a* at an intermediate location between the inner and outer ends 320*a,b* and may be directly communicable with the downhole tool 302. Accordingly, the second conduit 316*b* may be characterized as the "gauge port," and the metal-to-metal seal 222 may be arranged therein and fluidly communicate with the gauge conduit 226 via the weep hole 224.

As illustrated, one or more degradable plugs 328 (shown as first and second degradable plugs 328*a,b*) may be disposed or otherwise secured within the tool port 312 and used to prevent wellbore debris from obstructing fluid communication between the interior 310 of the body 301 and the downhole tool 302. More particularly, a first degradable plug 328*a* may be disposed within the first conduit 316*a*, and a second degradable plug 328*b* may be disposed within the second conduit 316*b*. In some embodiments, the degradable plugs 328*a,b* may be threaded and/or press fit into the first and second conduits 316*a,b*. In other embodiments, the degradable plugs 328*a,b* may be welded or brazed into place, or any combination of threading, press-fitting, welding, and brazing.

The configuration of the degradable plugs 328*a,b* illustrated in FIG. 3C may prove advantageous in providing a predetermined degradation or dissolution time before fluids in the interior 310 of the body 301 are able to access the downhole tool 302. More specifically, a well operator may be able to determine how much degradable material is required to be disposed within the tool port 312 before the degradable plugs 328*a,b* dissolve or degrade away, and thereby expose the downhole tool 302 to the fluids in the interior 310. Accordingly, the well operator may be able to design the volumetric flow area and/or lengths of the first and/or second conduits 316*a,b* such that sufficient degradable material of the degradable plugs 328*a,b* is used within the tool port 312 prior to the downhole tool 302. Once the first degradable plug 328*a* degrades or dissolves away at least up to the second conduit 316*b*, and the second degradable plug 328*b* dissolves up to the downhole tool 302 (e.g., the metal-to-metal seal 222), fluids within the interior 310 may then be able to enter the tool port 312 via the inlet 318 and access the downhole tool 302 via the first and second conduits 316*a,b*.

Figure 4A:
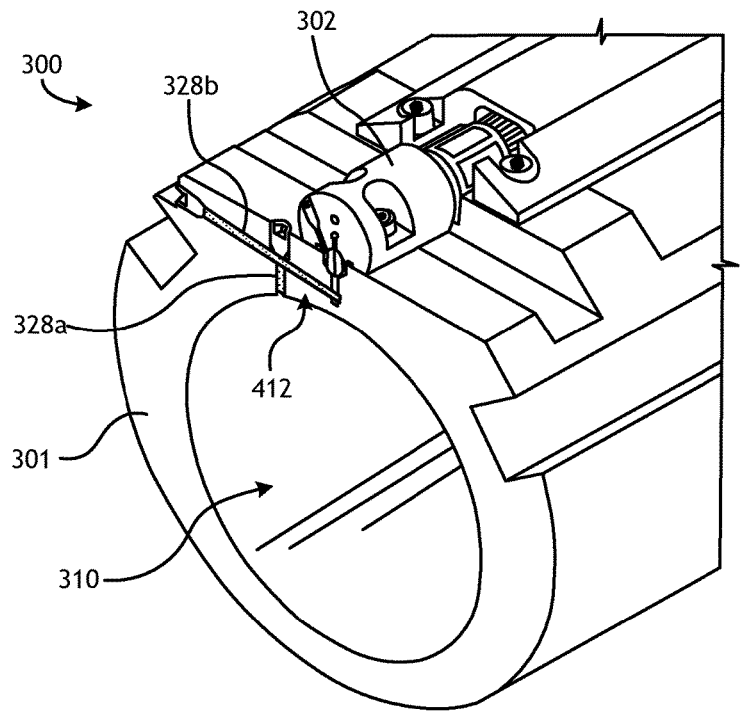
FIGS. 4A and 4B illustrate an additional embodiment of the casing mandrel of FIG. 3A, according to one or more embodiments of the present disclosure.
Figure 4B:
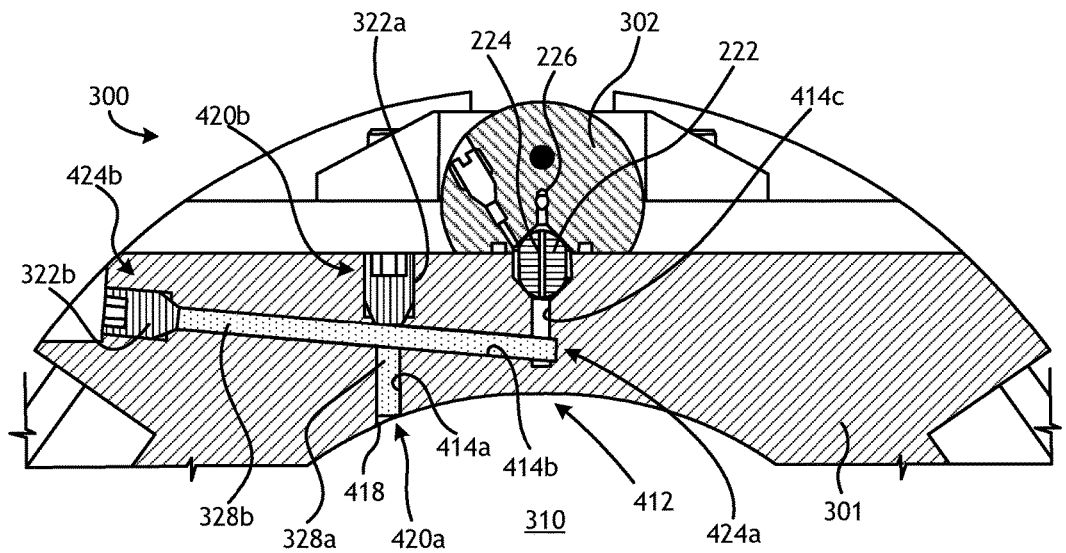

Referring now to FIGS. 4A-4B, with continued reference to FIG. 3A, illustrated are additional views and embodiments of the casing mandrel 300, according to one or more embodiments of the present disclosure. More particularly, FIG. 4A depicts a cross-sectional isometric view of the casing mandrel 300 taken along the Z-axis of FIG. 3A, and FIG. 4B depicts an enlarged end view of the cross-sectional view of the casing mandrel 300 of FIG. 4B. As depicted in FIGS. 4A-4B, the downhole tool 302 may be in fluid communication with the interior 310 of the body 301 via a tool port 412 defined in the body 301. The tool port 412 may be similar to the tool ports 212 and 312 of FIGS. 2B-2C and 3B-3C, respectively, and, therefore, may encompass or otherwise include one or more conduits that extend between the downhole tool 302 and the interior 310 of the body 301.

More specifically, and with reference to FIG. 4B, the tool port 412 may include a first conduit 414*a* and a second conduit 414*b* that fluidly and structurally intersects the first conduit 414*a*. The first conduit 414*a* may be defined in the body 301 and provide an inner end 420*a* and an outer end 420*b*. At the inner end 420*a*, the first conduit 414*a* may define or otherwise provide an inlet 418 into the tool port 412 from the interior 310 of the body 301. The outer end 420*b* of the first conduit 414*a* may communicate with the exterior of the body 301. Accordingly, the first conduit 414*a* may be defined through the body 301, from the exterior to the interior 310 thereof. In the illustrated embodiment, one or more port plugs 322*a* may be disposed within the first conduit 414*a* at or near the outer end 420*b*. The port plug 322*a* may be at least one of a threaded plug and an expansion plug (or a combination thereof) and may be useful in preventing wellbore debris from entering the first conduit 414*a* via the exterior of the body 301.

Similar to the first conduit 414*a*, the second conduit 414*b* may be defined in the body 301 and provide an inner end 424*a* and an outer end 424*b*. One or more port plugs 322*b* may be disposed within the second conduit 414*b* at or near the outer end 420*b*. The port plug 322*b* may be at least one of a threaded plug and an expansion plug (or a combination thereof) and may be useful in preventing wellbore debris from entering the second conduit 414*b* via the exterior of the body 301 at the outer end 424*b*. The second conduit 414*b* fluidly and structurally intersects the first conduit 414*a* at an intermediate location between the inner and outer ends 424*a,b*.

At the inner end 424*a*, the second conduit 414*b* may intersect and otherwise fluidly communicate with a third conduit 414*c* that is in direct fluid communication with the downhole tool 302. Accordingly, the third conduit 414*c* may be characterized as the "gauge port," and the metal-to-metal seal 222 may be arranged therein and fluidly communicate with the gauge conduit 226 via the weep hole 224.

As illustrated, one or more degradable plugs 328 (shown as first and second degradable plugs 328*a,b*) may be disposed or otherwise secured within the tool port 412 and used to prevent wellbore debris from obstructing fluid communication between the interior 310 of the body 301 and the downhole tool 302. More particularly, a first degradable plug 328*a* may be disposed within the first conduit 414*a*, and a second degradable plug 328*b* may be disposed with the second conduit 414*b*. In some embodiments, the degradable plugs 328*a,b* may be threaded and/or press fit into the first and second conduits 414*a,b*. In other embodiments, the degradable plugs 328*a,b* may be welded or brazed into place, or any combination of threading, press fitting, welding, and brazing. The port plugs 322*a,b* may be used to at least partially secure the degradable plugs 328*a,b* within the first and second conduits 414*a,b*, respectively.

Similar to the configuration of the degradable plugs 328*a,b* in FIG. 3C, the configuration of the degradable plugs 328*a,b* in FIG. 4B may prove advantageous in providing a predetermined degradation or dissolution time before fluids in the interior 310 of the body 301 are able to access the downhole tool 302. More specifically, a well operator may be able to determine how much degradable material is required within the tool port 412 before the degradable plugs 328*a,b* dissolve away and expose the downhole tool 302 to the fluids in the interior 310. Accordingly, the well operator may be able to design the diameter and/or lengths of the first and/or second conduits 414*a,b* such that sufficient degradable material of the degradable plugs 328a,b is used within the tool port 412 prior to the downhole tool 302. Once the first degradable plug 328a degrades or dissolves away, at least up to the second conduit 414b, and the second degradable plug 328b degrades or dissolves away toward the third conduit 414c, fluids within the interior 310 of the body 301 may then be able to enter the tool port 412 via the inlet 418 and access the downhole tool 302 via the first, second, and third conduits 414a-c.

Those skilled in the art will readily appreciate that the embodiments discussed herein are solely for illustrative purposes in describing the principles of the present disclosure. It will be appreciated that several different configurations of the tool ports 212, 312, 412 may be employed, without departing from the scope of the disclosure in order to ensure that wellbore debris is prevented from obstructing the gauges 202, 302.

While the embodiments described above are directed to placing a degradable plug within a tool port 212, 312, 412 that fluidly communicates with the interior of a casing mandrel, embodiments are also contemplated herein where a degradable plug is used to occlude a tool port that fluidly communicates with an exterior of the casing mandrel. The same materials described above with reference to the degradable plug 238 may be used in such embodiments.

Embodiments disclosed herein include:

A. A casing mandrel that includes a body having a first end and a second end, the first end being configured to be coupled to an upper portion of a casing string and the second end being configured to be coupled to a lower portion of the casing string, a downhole tool operatively coupled to an outer surface of the body, a tool port defined in the body and extending between the downhole tool and an interior of the body and thereby placing the downhole tool in fluid communication with the interior of the body, and at least one degradable plug disposed within the tool port to prevent wellbore debris from obstructing fluid communication between the interior and the downhole tool, wherein the degradable plug dissolves after a predetermined period of time or following exposure to a wellbore environment.

B. A wellbore system that includes a casing string arranged within a wellbore and an annulus being between the casing string and the wellbore, a casing mandrel having a body arranged within the casing string between upper and lower portions of the casing string, a downhole tool operatively coupled to an outer surface of the body such that the downhole tool is disposed within the annulus, a tool port defined in the body and extending between an interior of the body and the downhole tool, the tool port being configured to place the downhole tool in fluid communication with the interior of the body, and at least one degradable plug disposed within the tool port to prevent wellbore debris from obstructing fluid communication between the interior and the downhole tool, wherein the degradable plug dissolves after a predetermined period of time or following exposure to a wellbore environment.

C. A method that includes arranging a casing string within a wellbore, the casing string having a casing mandrel arranged therein between upper and lower portions of the casing string, arranging at least one degradable plug within a tool port defined in a body of the casing mandrel, the tool port extending between an interior of the body and a downhole tool operatively coupled to an outer surface of the body, permanently securing the casing string and the casing mandrel within the wellbore with cement pumped from a surface location and circulated through the casing string, the casing mandrel, and the annulus, preventing the cement from entering the tool port with the at least one degradable plug, and dissolving the at least one degradable plug after a predetermined period of time or following exposure to a wellbore environment and thereby establishing fluid communication between the interior of the body and the downhole tool.

Each of embodiments A, B, and C may have one or more of the following additional elements in any combination: Element 1: wherein the downhole tool is a gauge operable to monitor fluids present through the interior of the body via the tool port. Element 2: wherein the downhole tool is a chemical injector operable to inject a fluid into the interior of the body via the tool port. Element 3: wherein the at least one degradable plug is threaded into the tool port, press fit into the tool port, welded or brazed into the tool port, secured to the tool port with an adhesive, or any combination thereof. Element 4: wherein the at least one degradable plug comprises a degradable material selected from the group consisting of degradable polymers, oil-degradable polymers, dehydrated salts, a galvanically-corrodible metal, and any combination thereof. Element 5: wherein the degradable polymer is at least one of polyglycolic acid, polylactic acid, and polylactic co-glycolic acid. Element 6: wherein the wellbore environment is a wellbore parameter selected from the group consisting of temperature, pressure, a fluid, and any combination thereof. Element 7: wherein the tool port comprises one or more conduits extending between the interior of the body and the downhole tool, and wherein the at least one degradable plug is disposed in at least one of the one or more conduits. Element 8: wherein the one or more conduits comprises a first conduit defined in the body and providing an inner end and an outer end, wherein an inlet to the tool port from the interior is provided at the inner end and the outer end extends to an exterior of the body, one or more port plugs disposed within the first conduit at or near the outer end, and a second conduit defined in the body and in direct fluid communication with the downhole tool, the second conduit fluidly and structurally intersecting the first conduit. Element 9: wherein the one or more conduits comprises a first conduit defined in the body and providing a first inner end and a first outer end, wherein an inlet to the tool port from the interior is provided at the first inner end and the first outer end extends to an exterior of the body, one or more first port plugs disposed within the first conduit at or near the first outer end, a second conduit defined in the body and providing a second inner end and a second outer end, the second conduit fluidly and structurally intersecting the first conduit and the second outer end extending to the exterior of the body, one or more second port plugs disposed within the second conduit at or near the second outer end, and a third conduit structurally intersecting the second conduit and extending to the downhole tool. Element 10: further comprising a delay plug disposed within the tool port and interposing the interior of the body and the at least one degradable plug. Element 11: wherein the at least one degradable plug comprises a first degradable material and the delay plug comprises a second degradable material, and wherein the second degradable material is configured to degrade at a rate slower than the first degradable material. Element 12: wherein the delay plug comprises a non-degradable material and defines a weep hole that provides fluid communication between the interior of the body and the degradable plug.

Element 13: wherein the casing string and the casing mandrel are permanently secured within the wellbore with cement deposited in the annulus. Element 14: wherein the downhole tool is at least one of a gauge operable to monitor fluids flowing within the body via the tool port, and a chemical injector operable to inject a fluid into the interior of the body via the tool port. Element 15: wherein the at least one degradable plug comprises a degradable material selected from the group consisting of degradable polymers, oil-degradable polymers, dehydrated salts, a galvanically-corrodible metal, and any combination thereof. Element 16: wherein the tool port comprises one or more conduits extending between the interior of the body and the downhole tool, and wherein the at least one degradable plug is disposed in at least one of the one or more conduits. Element 17: further comprising a delay plug disposed within the tool port and interposing the interior of the body and the at least one degradable plug.

Element 18: wherein dissolving the at least one degradable plug comprises exposing the at least one wellbore plug to at least one of temperature, pressure, a fluid, and any combination thereof. Element 19: wherein the casing mandrel is a gauge mandrel and the downhole tool is a gauge, the method further comprising circulating a fluid through the casing string and the gauge mandrel, and detecting at least one of a temperature and a pressure of the fluid with the gauge. Element 20: wherein a delay plug is disposed within the tool port and interposes the interior of the body and the at least one degradable plug, the method further comprising slowing a degradation of the at least one degradable plug with the delay plug.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A casing mandrel, comprising:
   a body having a first end and a second end, the first end being configured to be coupled to an upper portion of a casing string and the second end being configured to be coupled to a lower portion of the casing string;
   a downhole tool operatively coupled to an outer surface of the body;
   a tool port comprising at least a first conduit and a second conduit fluidly and structurally intersecting the first conduit, the tool port defined in the body and extending between the downhole tool and an interior of the body and thereby placing the downhole tool in fluid communication with the interior of the body; and
   at least one degradable plug disposed within the tool port, wherein the at least one degradable plug degrades over time.

2. The casing mandrel of claim 1, wherein the downhole tool is a gauge operable to monitor fluids present through the interior of the body via the tool port.

3. The casing mandrel of claim 1, wherein the downhole tool is a chemical injector operable to inject a fluid into the interior of the body via the tool port.

4. The casing mandrel of claim 1, wherein the at least one degradable plug is placed into the tool port, threaded into the tool port, press-fit into the tool port, welded into the tool port, brazed into the tool port, adhesively secured to the tool port, or any combination thereof.

5. The casing mandrel of claim 1, wherein the at least one degradable plug comprises a degradable material selected from the group consisting of a degradable polymer, an oil-degradable polymer, a dehydrated salt, a galvanically-corrodible metal, and any combination thereof.

6. The casing mandrel of claim 5, wherein the degradable polymer comprises one selected from the group consisting of polyglycolic acid, polylactic acid, polylactic co-glycolic acid, and any combination thereof.

7. The casing mandrel of claim 1, wherein the at least one degradable plug degrades following exposure to a wellbore parameter selected from the group consisting of temperature, pressure, a fluid, and any combination thereof.

8. The casing mandrel of claim 1, wherein the at least one degradable plug is disposed in at least one of the first and second conduits.

9. The casing mandrel of claim 1, wherein:
   the first conduit is defined in the body and provides an inner end and an outer end, wherein an inlet to the tool port from the interior is provided at the inner end and the outer end extends to an exterior of the body;
   one or more port plugs are disposed within the first conduit at or near the outer end; and
   the second conduit is defined in the body and in direct fluid communication with the downhole tool.

10. The casing mandrel of claim 1, wherein:
    the first conduit is defined in the body and provides a first inner end and a first outer end, wherein an inlet to the tool port from the interior is provided at the first inner end and the first outer end extends to an exterior of the body;

one or more first port plugs are disposed within the first conduit at or near the first outer end;

the second conduit is defined in the body and provides a second inner end and a second outer end, the second outer end extending to the exterior of the body;

one or more second port plugs are disposed within the second conduit at or near the second outer end; and the casing mandrel further comprises a third conduit structurally intersecting the second conduit and extending to the downhole tool.

11. The casing mandrel of claim 1, further comprising a delay plug disposed within the tool port and interposing the interior of the body and the at least one degradable plug.

12. The casing mandrel of claim 11, wherein the at least one degradable plug comprises a first degradable material and the delay plug comprises a second degradable material, and wherein the second degradable material is configured to degrade at a rate slower than the first degradable material in a wellbore environment.

13. The casing mandrel of claim 11, wherein the delay plug is made of a non-degradable material and defines a weep hole that provides fluid communication between the interior of the body and the degradable plug.

14. A wellbore system, comprising:

a casing string arranged within a wellbore and an annulus being between the casing string and the wellbore;

a casing mandrel having a body arranged within the casing string between upper and lower portions of the casing string;

a downhole tool operatively coupled to an outer surface of the body such that the downhole tool is disposed within the annulus;

a tool port comprising at least a first conduit and a second conduit fluidly and structurally intersecting the first conduit, the tool port defined in the body and extending between an interior of the body and the downhole tool, and the tool port being configured to place the downhole tool in fluid communication with the interior of the body; and at least one degradable plug disposed within the tool port to prevent wellbore debris from obstructing fluid communication between the interior and the downhole tool, wherein the at least one degradable plug degrades over time.

15. The wellbore system of claim 14, wherein the casing string and the casing mandrel are permanently secured within the wellbore with cement deposited in the annulus.

16. The wellbore system of claim 14, wherein the downhole tool is at least one of a gauge operable to monitor fluids flowing within the body via the tool port, and a chemical injector operable to inject a fluid into the interior of the body via the tool port.

17. The wellbore system of claim 14, wherein the at least one degradable plug comprising a degradable material selected from the group consisting of degradable polymers, oil-degradable polymers, dehydrated salts, a galvanically-corrodible metal, and any combination thereof.

18. The wellbore system of claim 17, wherein the degradable polymer comprises at least one of polyglycolic acid, polylactic acid, and polylactic co-glycolic acid.

19. The wellbore system of claim 14, wherein the at least one degradable plug degrades following exposure to a wellbore parameter selected from the group consisting of temperature; pressure, a fluid, and any combination thereof.

20. The wellbore system of claim 14, wherein the at least one degradable plug is disposed in at least one of the first and second conduits.

21. The wellbore system of claim 14, further comprising a delay plug disposed within the tool port and interposing the interior of the body and the at least one degradable plug.

22. A method, comprising:

arranging a casing string within a wellbore, the casing string having a casing mandrel arranged therein between upper and lower portions of the casing string;

arranging at least one degradable plug within at least one of a first conduit and a second conduit of a tool port defined in a body of the casing mandrel, the second conduit fluidly and structurally intersecting the first conduit, and the tool port extending between an interior of the body and a downhole tool operatively coupled to an outer surface of the body;

securing the casing string and the casing mandrel within the wellbore with a cement composition;

preventing the cement composition from entering the tool port with the at least one degradable plug; and degrading the at least one degradable plug over time to establish fluid communication between the interior of the body and the downhole tool.

23. The method of claim 22, wherein the at least one degradable plug comprises a degradable material selected from the group consisting of degradable polymers, oil-degradable polymers, dehydrated salts, a galvanically-corrodible metal, and any combination thereof.

24. The method of claim 23, wherein the degradable polymer comprises at least one of polyglycolic acid, polylactic acid, and polylactic co-glycolic acid.

25. The method of claim 22, wherein dissolving the at least one degradable plug comprises exposing the at least one degradable plug to at least one of temperature, pressure, a fluid, and any combination thereof.

26. The method of claim 22, wherein the casing mandrel is a gauge mandrel and the downhole tool is a gauge, the method further comprising:

circulating a fluid through the casing string and the gauge mandrel; and detecting at least one of a temperature and a pressure of the fluid with the gauge.

27. The method of claim 22, wherein a delay plug is disposed within the tool port and interposes the interior of the body and the at least one degradable plug, the method further comprising slowing a degradation of the at least one degradable plug with the delay plug.

* * * * *